May 21, 1963     W. A. RACZYNSKI ET AL     3,090,717
METHOD OF LAMINATING SHEETS

Filed Feb. 8, 1960     2 Sheets-Sheet 1

INVENTORS
Walter A. Raczynski,
BY Martin R. Levin,
Charles J. Voss, Jr.,

Byron Hume Groen & Clement
ATTYS.

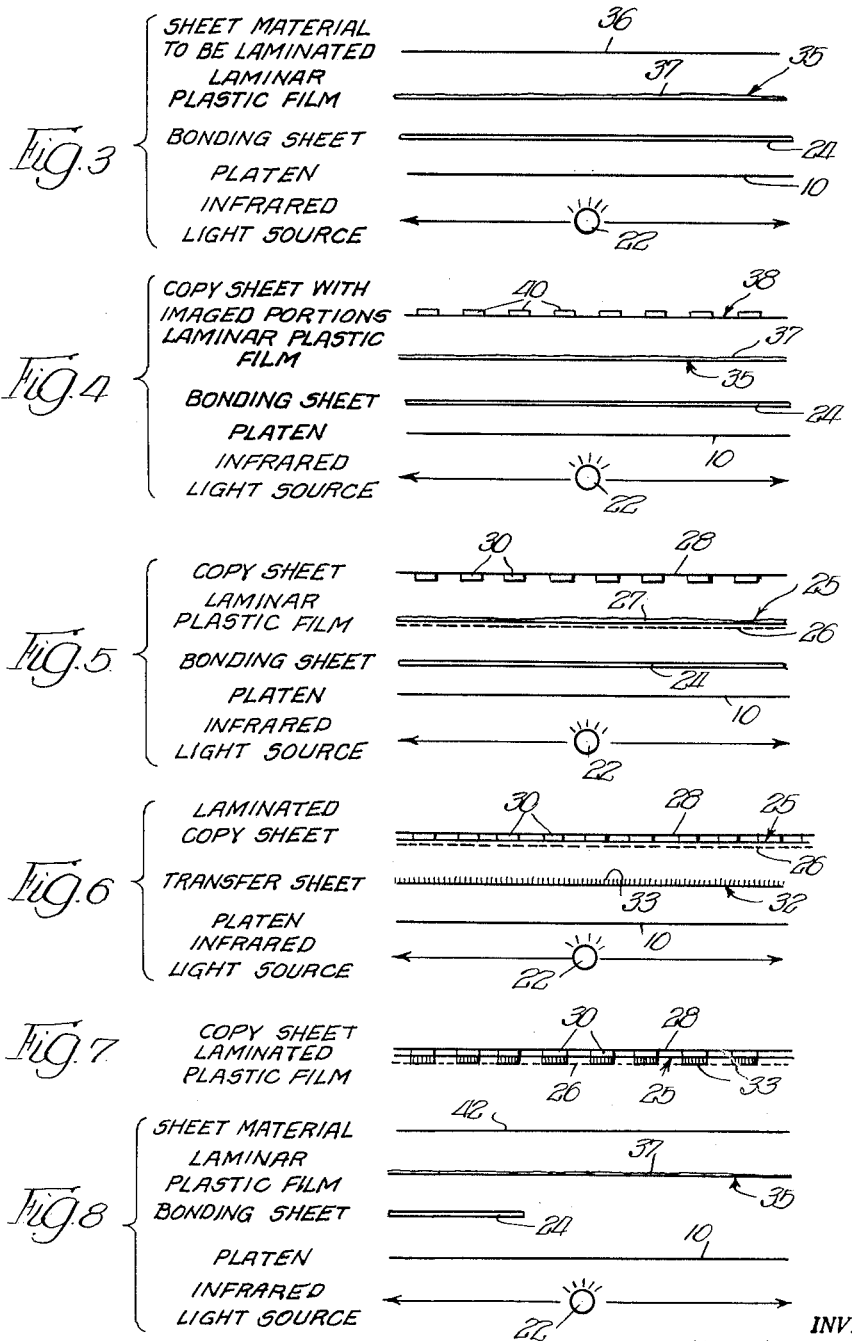

1

3,090,717
METHOD OF LAMINATING SHEETS
Walter A. Raczynski, Park Ridge, Martin R. Leven, Morton Grove, and Charles J. Voss, Jr., Elmhurst, Ill., assignors, by mesne assignments, to Ditto, Incorporated, Chicago, Ill., a corporation of Delaware
Filed Feb. 8, 1960, Ser. No. 7,384
5 Claims. (Cl. 156—272)

The invention relates to methods of forming laminated structures, and has reference more particularly to novel and improved methods of producing laminated structures by permanently bonding plastic films to other plastic materials or to sheet material such as paper, cloth, metal foils and glassine materials.

One of the main objectives of the invention is to laminate a thin plastic film such as Mylar, cellulose acetate, cellophane and the like to such sheet materials as paper, metal and cloth or to another plastic surface by a method which is simple, inexpensive and rapid and wherein said method involves a highly efficient heat and pressure contact system. Thus the invention makes it possible to prepare a planographic printing plate, or to decorate or protect other sheet metals on either one side or both sides. The method has the additional advantage in that air bubbles and wrinkles are completely eliminated in the laminations due primarily to the type of system which urges the assembly into intimate contact. The pressure between the sheets is preferably created by vacuum but it is contemplated that a positive pressure will provide equivalent results.

The method used heretofore to permanently bond a thin plastic film to other sheet material employed a heat source of the electrical resistance type and wherein the sheet to be laminated was combined with the plastic film under some type of pressure system. Thus by passing the sheets through a set of metal rollers, for example, and which were heated, the plastic sheet was bonded to the surface of the sheet material.

The above mentioned type of lamination is difficult to control, particularly if large surface areas are involved. The heat-contact pressure area is confined to the point of tangency between the sheets and the metal rollers. This results in uneven heat distribution. The feeding of sheets of different thicknesses also presented a problem resulting in one sheet feeding at a faster rate than the other, producing wrinkling and creasing of the thinner sheet. Also air entrapment between the laminate and the sheet caused the formation of bubbles in the plastic.

Existing methods of laminating a plastic film to another sheet of material have the further limitation of being unable to selectively laminate the two sheets in a specific or defined area once the sheets are exposed to the heat system. The method of laminating the film by applying direct heat and pressure tend to damage the surface of the delicate laminating film, particularly if it is a treated surface and especially if the pressure is applied as from the rolling action of metal rollers. If the assembly to be laminated is comprised of the sheets sandwiched between two thin films of plastic, the rolling action would usually displace the thinner sheets.

Accordingly a more specific object of the invention is to provide a laminating method based on the use of a rapid, simple and efficient heat system and whereby a plastic film which may have a chemically treated surface on one side and a coated surface on the other may be bonded to another sheet in order to prepare a planographic printing plate.

A further object is to reinforce a thin sheet of material, such as may be used as a planographic printing plate, by laminating a plastic film to the back of the sheet, whereby to render it more stable to continual exposure to moisture.

2

Another object of the invention is to laminate a plastic film to another sheet of material in order to protect it, either on one side or on both sides, for purposes of decoration.

A still further object of the invention resides in the provision of a method having the additional capabilities of laminating only a specific area or areas of a sheet and which will not require any extra or special equipment.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 3 is a schematic illustration of a typical assembly employing the bonding sheet of the invention for creating the uniform heat source for laminating a plastic film for purposes of protection or decoration;

FIGURE 4 is a schematic illustration similar to FIGURE 3 but showing the method of laminating a plastic film to the back of an imaged copy sheet;

FIGURE 5 is a schematic illustration of an assembly for producing a planographic printing surface and wherein the plastic film has been treated on one side to provide a hydrophilic surface and is coated on its opposite side with a thermoplastic material;

FIGURES 6 and 7 are schematic views illustrating the procedures employed for producing a printing image on the hydrophilic surface of the plastic film employed in the assembly of FIGURE 4; and, FIGURE 8 is a schematic illustration showing the manner of laminating only certain defined or specific areas of a sheet by bonding thereto a plastic film.

Figure 1:
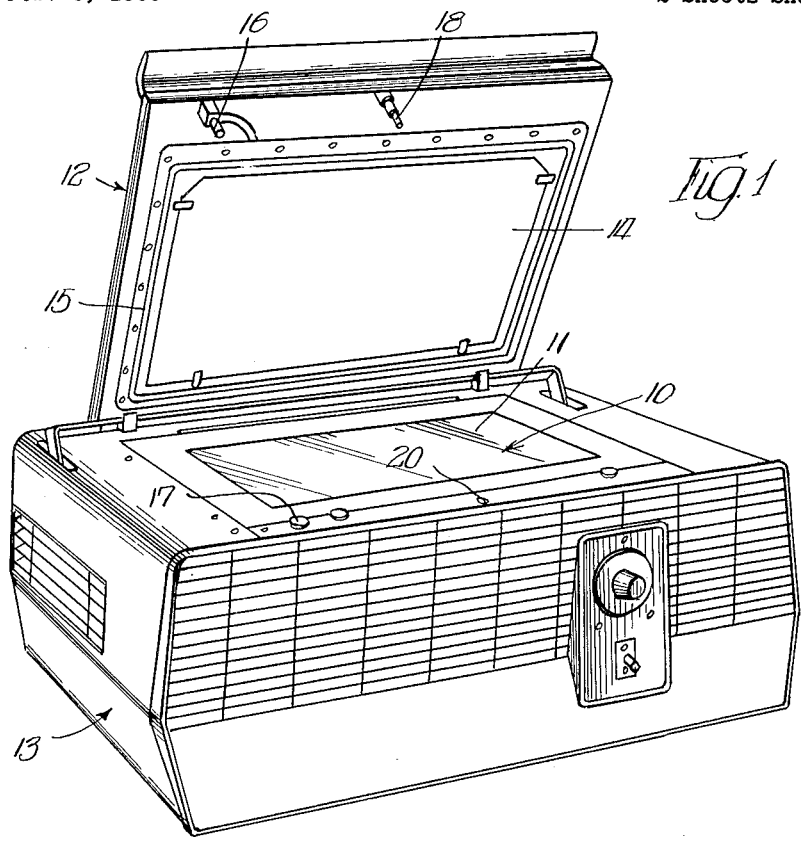
FIGURE 1 is a perspective view showing a preferred form of apparatus for supplying the source of infrared energy and which incorporates a combination of elements providing the desired pressure system.
Figure 2:
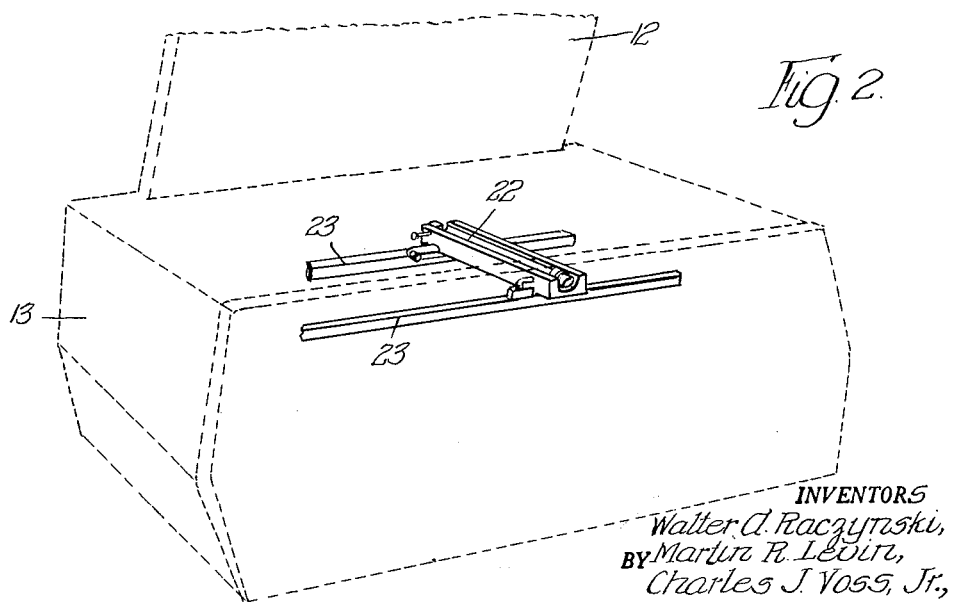
FIGURE 2 is a perspective view showing the location of the source of infrared energy in the apparatus of FIGURE 1 and which additionall illustrates its mode of operation.

Referring to the drawings and in particular to FIGURES 1 and 2 the device disclosed constitutes a preferred form of apparatus for producing the laminated structures according to the method of the invention and wherein a flat transparent platen 10 is provided, generally constructed of glass, and therefore having a flat and smooth top surface 11 for supporting the sheet material required for the laminating method. The lid 12 of the apparatus is pivoted to the base portion 13 for movement with respect to the platen 10. Said lid on its underside is equipped with a deflatable blanket 14 of rubber or similar flexible material and which has the ability to contract against the platen surface 11 when the lid is closed. This is due to atmospheric pressure when the chamber, which is formed between the platen surface 11 and the blanket 14 is partially evacuated of its air. Thus by creating a partial vacuum within the chamber, and which is facilitated by the peripheral flanges 15, the blanket is caused to adhere to and apply pressure to the platen for maintaining the sheet materials employed in the laminating method in the desired fixed relationship and in flat, intimate and uniform contact throughout the entire area of said materials. The numerals 16 and 17 indicate the connections for effecting the vacuum and 18 is a lock for holding the lid closed and which may be released by the release button 20.

An infrared light source 22 is positioned under the glass platen 10 and the same is suitably mounted on the longitudinal rails 23 for traversing movement, that is, back and forth reciprocating movement to and from the respective sides of the base portion 13. A form of power means, not shown, is provided for effecting the reciprocating movement under the control of the operator. The light source emits radiations predominantly in the infrared band of the spectrum and the same may have a rating of approximately 1620 watts at a potential of approximately 336 volts. For a more particular description of the apparatus of FIGURES 1 and 2 reference is made to Patent No. 3,007,390, granted November 7, 1961, in the name of Forester and Gross and entitled Exposure Device.

When an assembly such as shown in FIGURES 3, 4, 5 and 8 is placed on the glass platen 10 and the lid 12 is closed, the assembly is thereby placed in uniform pressure due to the blanket 14 being deflated and the said assembly is subsequently exposed to infrared radiations. The heat system which accomplishes the laminating requires the use of a special infrared absorptive heat generating sheet which may be termed a bonding sheet, the same being designated in said figures by the numeral 24. The said bonding sheet in accordance with the invention must have the characteristics of being infrared absorptive and heat generating upon exposure to an infrared light source. To attain these characteristics, the bonding sheet 24 is treated with or is formed of highly infrared absorptive pigments, dyes or substances which exhibit this characteristic. The bonding sheet must also have certain characteristics of surface smoothness in order that an extremely intimate contact may be maintained between the plastic film and the surface of the bonding sheet for the most uniform development of a heat pattern. For such a bonding sheet carbon black impregnated paper having a smoothness of approximately 350 maximum Sheffield units and a maximum thickness of approximately 8 mils has been found to give entirely satisfactory results. Where a bonding sheet of greater roughness was employed, a discontinuous bonding resulted because of the incomplete transmission of heat. However, upon using a bonding sheet as herein specified and exposing the same to a 1620 watt infrared lamp such as 22, FIGURE 2, a temperature rise will occur dependent on the traverse time selected for the exposure device. It is possible to get an instantaneous temperature rise above ambient temperature ranging from 30° F. to 200° F. dependent on the traverse time selected. The traverse time required will depend on the thermoplastic material used for the plastic sheet. The Mylar film coated with polyethylene requires a traverse time which will uniformly apply to the thermoplastic a 100° F. temperature rise above ambient. Because of the requirement of generating a uniform heat pattern the bonding sheet must absorb the infrared energy uniformly.

The infrared absorptivity must be homogeneous across the area so that a uniform heat generation will result. This is determined by the temperature rise as measured by thermo-couple readings at various locations across the sheet. The temperature rise in any location on the bonding sheet must meet the heat generation requirements of the thermoplastic coating present on the protective film. Further the various areas on the bonding sheet should generate heat at about the same level so that overall resulting patterns will be uniform causing the thermoplastic to be bonded in all areas of contact with the sheet to be laminated. When using Mylar coated with polystyrene the temperature rise in any location must meet the minimum temperature rise of 100° F. over the ambient temperature within a tolerance of plus or minus 10° F.

Referring to FIGURE 5 the bonding sheet 24 is placed on the glass platen 10, and the complete assembly as it appears in this figure is placed on top of the bonding sheet. The platen in the preferred embodiment of the apparatus is made of glass, but the same may be made of any transparent material which will not block the transmission of the infrared radiations and which will also have sufficient resistance to the quantity of heat developed. The laminar sheet 25 is placed in contact with the bonding sheet 24, with the copy sheet being placed over the said laminar sheet. The said sheet 25 is preferably a plastic, such as cellulose acetate, and the same may have a thickness of approximately 5 mils. Other types of plastic film may be employed for the laminar sheet, such as cellulose acetate butyrate, Mylar and cellophane. The laminar sheet of FIGURE 5 is characterized by a hydrophilic surface 26 on the underside of the sheet and which is formed by pretreating the laminar acetate sheet with a hydrolyzing solution. The top side of the film sheet 25 is coated with a thermoplastic 27 such as polyethylene. Other types of thermoplastic coatings may be used. It is contemplated that the subject material to be laminated may itself be coated with a thermoplastic material. Thus the film protective sheet which may be bonded to said coated sheet material does not have to contain the thermoplastic material permitting a wide variety of suitable film to be laminated to the sheet.

In forming the assembly as shown in FIGURE 5, the hydrophilic surface 26 is placed in contact with the bonding sheet 24 which locates the thermoplastic coated surface 27 face up. On top of the coated surface is placed the sheet material providing the copy sheet 28, to the undersurface of which the plastic sheet 25 is to be laminated. The copy sheet may be a letter, a printed form, or a page from a magazine. The imaged portions 30 must be formed of characters which are infrared absorptive and, therefore, heat generating. Printed copy in black ink will generally meet this requirement. With the elements of the complete assembly in the relationship as described, the next step in the method consists in closing the lid 12 to which is affixed the rubber blanket 14. Closing of the lid actuates the vacuum pump causing an evacuation of the chamber between the blanket and the glass platen, thereby placing the elements of the assembly in intimate and uniform contact with one another. Thus the elements of the complete assembly are maintained in a fixed position relative to one another during the entire exposure cycle. The pressure applied by the rubber blanket is an important factor in the success of the present method, since the entrapment of air between the sheets is eliminated, with the consequent elimination of bubbles. Also, wrinkles and creases in the sheets are substantially smoothed out. Accordingly, the technique of maintaining the various sheets in intimate contact and under uniform pressure throughout their entire extent while exposing the assembly to infrared radiations results in obtaining a curl fee, laminated end product and even when laminating extremely thin sheets of foil or paper. By deflating the blanket against the glass, even pressure is obtained on the sheets over the entire area of the assembly.

When the vacuum step is completed the infrared lamp 22 is next energized with the result that infrared radiations are directed onto the bonding sheet as it makes its traverse underneath the glass platen. The bonding sheet absorbs the infrared radiations and converts them to heat which is conducted to the thermoplastic layer 27 of the laminar film. As the heat is absorbed by the thermoplastic layer, from the heat pattern effect of the bonding sheet, the thermoplastic layer softens and it bonds to the image side of the copy sheet uniformly and evenly, and while the assembly is held in close contact under conditions of pressure. Thus, the pattern of even heat is brought to the thermoplastic coating by the sweep action of the infrared source, while the elements of the assembly are maintained in fixed relation and in intimate contact to result in a permanent uniform bond between the film and the copy sheet. The heat blanket effect may also be achieved by exposing the entire bonding sheet area simultaneously to infrared light energy. Thus the entire area of the laminar film would be heated uniformly and the bonding action would take place over the area to be laminated at the same time. This heat blanket which is developed as a result of the bonding sheet provides a bubble-free, curl-free laminated product.

The laminar film, since it has one side coated with a thermoplastic material, may have some of the thermoplastic coating flow from the edges of the same onto the bonding sheet and cause the assembly to adhere to the edges. To prevent this, it is possible to use silicones as a surface treatment for the bonding sheet. When the bonding sheet is treated with a silicon, adhesion of the exposed thermoplastic coating is effectively and completely prevented.

FIGURE 6 illustrates the manner in which the laminated copy sheet, FIGURE 5, may be processed to serve as a reproducing medium on a lithographic duplicator. The copy sheet 28 is shown as having the plastic film 25 bonded thereto with the hydrophilic surface 26 being located on the underside of the assembly. This hydrophilic surface is placed in contact with a transfer sheet 32. The transfer sheet is oleophilic, since it has its top surface coated with a grease receptive material 33 which is solid at room temperature and which is placed in contact with the surface 26 of the laminated assembly. The entire assembly is then placed on the glass platen with the noncoated surface of the transfer sheet 32 being in contact with the platen. The lid 12 of the apparatus is closed and the infrared light source is now directed onto the back of the transfer sheet. The infrared energy is transmitted through the sheet and through the laminar film onto the infrared absorptive-heat generating image on the copy sheet. The heat is conducted to the heat sensitive coating 33 on the transfer sheet 32, causing the coating to soften and transfer to the hydrophilic surface of the film 25. The transfer occurs in exact configuration to the image on the copy sheet as a result of the heat image being precisely transmitted. Upon stripping the transfer sheet from the laminated assembly, the same yields a planographic printing surface such as illustrated in FIGURE 7. Thus the copy sheet has been directly converted into a lithographic master using the heat system described herein in conjunction with the invention as disclosed in the copending application Serial No. 7,482, filed February 8, 1960, in the name of Raczynski and Quoss, and entitled "Method of Preparing Copies Including Masters," and which is a continuation-in-part of Serial No. 726,378, now abandoned.

The preferred procedure for laminating a sheet such as a document, letter or photograph with a plastic film is depicted in FIGURE 3. The bonding sheet 24 is placed on the glass platen 10. The laminar film 35 to be bonded to the copy sheet 36 is placed on top of the bonding sheet as shown. Here again, the laminar film may be composed of cellulose acetate, Mylar, or the same may be any stable transparent plastic film, the top surface of which is coated with a thermoplastic material 37. A thin sheet of Mylar of approximately 5 mils thickness and coated with polyethylene as the thermoplastic material has been found to give entirely satisfactory results. The assembly is then subjected to the vacuum and exposure steps of the method, and which results in bonding the film to the underside of the copy sheet for protection or for decorative purposes. To laminate the top side of the sheet the same is turned over and the steps repeated with a second sheet of laminar film. With both sides laminated with a plastic film, the copy sheet will be completely protected.

In FIGURE 4 the copy sheet 38 may be a direct image paper mat or any other sheet material having a hydrophilic top surface and which is suitably imaged as at 40 for accepting ink for use in lithographic type duplicating processes. The back of such a sheet can be laminated according to the present method for rendering it more stable to moisture exposure. The laminar plastic film 35 is placed on top of the bonding sheet 24 with the thermoplastic coating 37 face up. The back of the copy sheet 38 is placed in contact with the thermoplastic coating and the complete assembly is exposed to infrared radiations. The bonding sheet absorbs the radiations and converts them to heat energy resulting in a line of heat emanating from the bonding sheet which causes the thermoplastic sheet to soften and bond under conditions of intimate contact with the back of the copy sheet 38 so as to form a permanent bond therewith. The result is a flat lying, curl free and dimensionally stable planographic printing surface having greatly increased resistance to water penetration so as to provide longer copy runs.

When it is desired to apply the laminar film in a defined or to a specific area on a copy sheet or other document, it is necessary only to expose the film to a bonding sheet of the desired shape and which is placed in the proper location with respect to the subassembly. Thus, if it is desired to laminate a plain sheet of material, such as 42 in FIGURE 8, along the left hand margin only, the bonding sheet 24 is cut to the width of the area to be bonded and placed at the left of the assembly. As explained with respect to FIGURE 3 the laminar plastic film 35 having the top surface 37 thereof coated with a thermoplastic is placed between the sheet material 42 and the bonding sheet 24. Upon exposure to infrared radiations, a strip of the film in alignment with and in direct contact with the bonding sheet, will be permanently bonded to the underside of the sheet material 42. The only limitation to the specific number of shapes capable of being laminated to various subject sheets is limited only by the shapes to which the bonding sheet may be cut.

The precise methods and descriptions set forth herein are intended to be illustrative and not necessarily to constitute limitations on the scope of our invetnion as defined in the following claims.

What is claimed is:

1. The method of laminating a flexible film to sheet material, said film having a thermoplastic coated surface, the steps which include the formation of a sub-assembly wherein the coated surface of the film is in contact with one surface of the sheet material, forming a complete assembly by adding to the sub-assembly an infrared absorbing heat generating sheet with the film being interposed between the sheet material and the said sheet, said sheet being capable of generating heat when exposed to infrared radiations, maintaining the elements of the complete assembly in fixed relationship and in a condition of intimate and uniform contact with one another throughout their entire extent, and then subjecting said sheet to infrared radiations while the complete assembly is maintained in said fixed relationship and in said intimate and uniform contact, whereby to create a uniform pattern of heat emanating from the infrared absorbing heat generating sheet to cause the film to be bonded to the sheet material, without said infrared absorbing heat generating sheet becoming a part of the laminate.

2. The method of laminating a thin film of plastic material to one surface of a copy sheet and wherein a thermoplastic material layer is interposed between the film and the said surface of the copy sheet, the steps which include placing the copy sheet on the film with the thermoplastic material layer interposed therebetween to form a sub-assembly, forming a complete assembly by placing the sub-assembly on an infrared absorbing heat generating sheet with the film and the thermoplastic material layer being interposed between the copy sheet and the said sheet, said sheet being capable of generating heat when exposed to infrared radiation and said sheet being flat throughout and having a substantially smooth surface for contact with the film, placing the complete assembly on a platen of transparent material with the sheet in contact with the platen, maintaining the elements of the complete assembly in fixed relationship and in a condition of intimate and uniform contact with one another throughout their entire extent, and then subjecting the sheet to infrared radiations while the complete assembly is maintained in said fixed relationship and in said intimate and uniform contact, whereby to create a uniform pattern of heat emanating from the infrared absorbing and heat generating sheet to cause the film to be bonded to the said one surface of the copy sheet, without said infrared absorbing heat generating sheet becoming a part of the laminate.

3. The method of laminating a thin film of plastic material to one surface of a copy sheet as defined by claim 2, which additionally includes the step of applying pressure to the complete assembly to maintain the elements of the same in fixed relationship with one another and also fixed as regards the platen and in intimate and uniform contact throughout their entire extent.

4. The method of laminating a thin film of plastic material to one surface of a copy sheet, said film having a thermoplastic coated surface, the steps which include the formation of a sub-assembly wherein the coated surface of the film is in contact with said one surface of the copy sheet, forming a complete assembly by placing the sub-assembly on an infrared absorbing heat generating sheet with the film being interposed between the copy sheet and the said sheet, said sheet being capable of generating heat when exposed to infrared radiation and said sheet being flat throughout and relatively smooth surfaced, placing the complete assembly on a rigid platen of transparent material with the sheet in contact with the platen, enclosing the complete assembly in a flexible walled chamber wherein the platen provides the other wall, maintaining the elements of the complete assembly in fixed relationship on the platen and in a condition of intimate and uniform contact with one another throughout their entire extent by evacuating the air from the chamber to effect a partial vacuum within the chamber, and then subjecting the said sheet to infrared radiations while the complete assembly is maintained within said partially evacuated chamber whereby to create a uniform pattern of heat emanating from the infrared absorbing heat generating sheet to cause the film to be bonded to the said one surface of the copy sheet, without said infrared absorbing heat generating sheet becoming a part of the laminate.

5. The method of laminating a flexible film to a copy sheet having imaged portions on one surface, said film having a thermoplastic coated surface and a treated hydrophilic surface on the opposite side, the steps which include the formation of a sub-assembly wherein the coated surface of the film is in contact with the imaged surface of the copy sheet, forming a complete assembly by adding an infrared absorbing heat generating sheet to the sub-assembly with the film being interposed between the copy sheet and the said sheet, said sheet being capable of generating heat when exposed to infrared radiations, maintaining the elements of the complete assembly in fixed relationship and in a condition of intimate and uniform contact with one another throughout their entire extent, subjecting the sheet to infrared radiations while the complete assembly is maintained in said fixed relationship and in said intimate and uniform contact, whereby to create a uniform blanket of heat emanating from the infrared absorbing heat generating sheet to cause the film to be bonded to the copy sheet, without said infrared absorbing heat generating sheet becoming a part of the laminate, forming a second assembly by substituting a transfer sheet for the infrared absorbing heat generating sheet, said transfer sheet having an oleophilic coated surface on one side and which is in contact with the hydrophilic surface of the laminated copy sheet, subjecting the second assembly to infrared radiations while maintaining all elements thereto in fixed relationship and in intimate and uniform contact, and then stripping the transfer sheet from the laminate to provide the same with a planographic printing surface.

References Cited in the file of this patent
UNITED STATES PATENTS

| | | |
|---|---|---|
| 2,490,111 | Whitehead | Dec. 6, 1949 |
| 2,496,911 | Green | Feb. 7, 1950 |
| 2,622,053 | Clowe et al. | Dec. 16, 1952 |
| 2,794,104 | Nathan | May 28, 1957 |
| 2,808,777 | Roshkind | Oct. 8, 1957 |